United States Patent
Holmes

(10) Patent No.: US 10,112,432 B2
(45) Date of Patent: Oct. 30, 2018

(54) SECURITY DEVICE

(71) Applicant: DE LA RUE INTERNATIONAL LIMITED, Basingstoke, Hampshire (GB)

(72) Inventor: Brian William Holmes, Hampshire (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 291 days.

(21) Appl. No.: 15/014,557

(22) Filed: Feb. 3, 2016

(65) Prior Publication Data

US 2016/0152066 A1  Jun. 2, 2016

Related U.S. Application Data

(62) Division of application No. 13/580,995, filed as application No. PCT/GB2011/050362 on Feb. 24, 2011, now abandoned.

(30) Foreign Application Priority Data

Feb. 24, 2010 (GB) .................... 1003136.7

(51) Int. Cl.
*B42D 25/324* (2014.01)
*B42D 25/29* (2014.01)
(Continued)

(52) U.S. Cl.
CPC .......... *B42D 25/324* (2014.10); *B42D 25/29* (2014.10); *B42D 25/328* (2014.10); *B42D 25/40* (2014.10); *G03H 1/0011* (2013.01); *G03H 1/0256* (2013.01); *G03H 1/30* (2013.01); *G07D 7/0032* (2017.05); *G07D 7/207* (2017.05); *B42D 2033/18* (2013.01); *B42D 2033/20* (2013.01); *G03H 2250/34* (2013.01); *Y10T 29/4998* (2015.01)

(58) Field of Classification Search
CPC ....................... B42D 25/328; B42D 2033/10
See application file for complete search history.

(56) References Cited

U.S. PATENT DOCUMENTS

| 4,631,222 A | 12/1986 | Sander |
| 4,728,377 A | 3/1988 | Gallagher |
| (Continued) | | |

FOREIGN PATENT DOCUMENTS

| AU | 16135/95 A | 10/1995 |
| AU | 33401/95 A | 3/1996 |
| (Continued) | | |

OTHER PUBLICATIONS

Jun. 10, 2011 International Search Report issued in International Patent Application No. PCT/GB2011/050362.

*Primary Examiner* — Kyle R Grabowski
(74) *Attorney, Agent, or Firm* — Oliff PLC

(57) ABSTRACT

A security device comprises a transparent, colored element in a first region of the device and in a surface of which a first optically variable effect generating relief structure is formed. A reflection enhancing layer extends over the first optically variable effect generating relief microstructure and follows the contour of the relief, the reflection enhancing layer also being provided in a second region of the device laterally offset from the first region.

31 Claims, 7 Drawing Sheets

(51) Int. Cl.
*B42D 25/328* (2014.01)
*B42D 25/40* (2014.01)
*G03H 1/00* (2006.01)
*G03H 1/02* (2006.01)
*G03H 1/30* (2006.01)
*G07D 7/00* (2016.01)
*G07D 7/207* (2016.01)

(56) References Cited

U.S. PATENT DOCUMENTS

| | | | |
|---|---|---|---|
| 4,758,296 A | 7/1988 | McGrew | |
| 5,538,753 A * | 7/1996 | Antes | B42D 25/328 427/164 |
| 5,714,231 A | 2/1998 | Reinhart | |
| 6,302,989 B1 * | 10/2001 | Kaule | B42D 25/328 427/146 |
| 6,508,489 B2 * | 1/2003 | Herrmann | B42D 25/328 283/107 |
| 7,884,983 B2 * | 2/2011 | Funada | B44C 1/1704 283/93 |
| 2005/0012326 A1 * | 1/2005 | Keller | B42D 25/355 283/94 |
| 2005/0118537 A1 | 6/2005 | Lutz et al. | |
| 2006/0114530 A1 * | 6/2006 | Morwald | B42D 25/328 359/2 |
| 2008/0160226 A1 | 7/2008 | Kaule et al. | |
| 2008/0239216 A1 * | 10/2008 | Miyamoto | B42D 25/328 349/113 |
| 2008/0246272 A1 | 10/2008 | Vast et al. | |
| 2009/0033085 A1 | 2/2009 | Suto et al. | |
| 2010/0320742 A1 | 12/2010 | Hoffmuller et al. | |
| 2011/0095518 A1 | 4/2011 | Hoffmuller et al. | |
| 2011/0115212 A1 * | 5/2011 | Hoffmuller | B42D 25/328 283/85 |
| 2011/0127762 A1 * | 6/2011 | Hoffmuller | B42D 25/425 283/72 |
| 2011/0239886 A1 * | 10/2011 | Holmes | B42D 25/328 283/85 |

FOREIGN PATENT DOCUMENTS

| | | | |
|---|---|---|---|
| CA | 2424655 A1 | 3/2003 | |
| CA | 2579470 A1 | 4/2006 | |
| EP | 0 059 056 A1 | 9/1982 | |
| EP | 0609683 A1 | 8/1994 | |
| EP | 0675006 A1 | 10/1995 | |
| EP | 0 860 298 A2 | 8/1998 | |
| EP | 1141480 B1 | 2/2004 | |
| EP | 1652688 A1 | 5/2006 | |
| EP | 1294576 B1 | 9/2008 | |
| GB | 2390056 A | 12/2003 | |
| WO | 83/00659 A1 | 3/1983 | |
| WO | 94/25288 A1 | 11/1994 | |
| WO | 96/07552 A1 | 3/1996 | |
| WO | 02/00446 A1 | 1/2002 | |
| WO | 02/36357 A1 | 5/2002 | |
| WO | 2003/054297 A3 | 7/2003 | |
| WO | 03/095226 A1 | 11/2003 | |
| WO | 03/0955188 A2 | 11/2003 | |
| WO | 2005/047012 A1 | 5/2005 | |
| WO | 2005/061242 A1 | 7/2005 | |
| WO | 2006/040069 A1 | 4/2006 | |
| WO | 2006/087138 A1 | 8/2006 | |
| WO | 2008/017362 A2 | 2/2008 | |
| WO | 2009/080264 A1 | 7/2009 | |
| WO | WO-2009080264 A1 * | 7/2009 | B42D 25/29 |
| WO | 2009/095227 | 8/2009 | |
| WO | 2009/100869 A2 | 8/2009 | |
| WO | 2010/000470 A1 | 1/2010 | |
| WO | WO-2010015384 A2 * | 2/2010 | B42D 25/328 |
| WO | 2010/049676 A1 | 5/2010 | |
| WO | 2011/104551 A1 | 9/2011 | |

\* cited by examiner

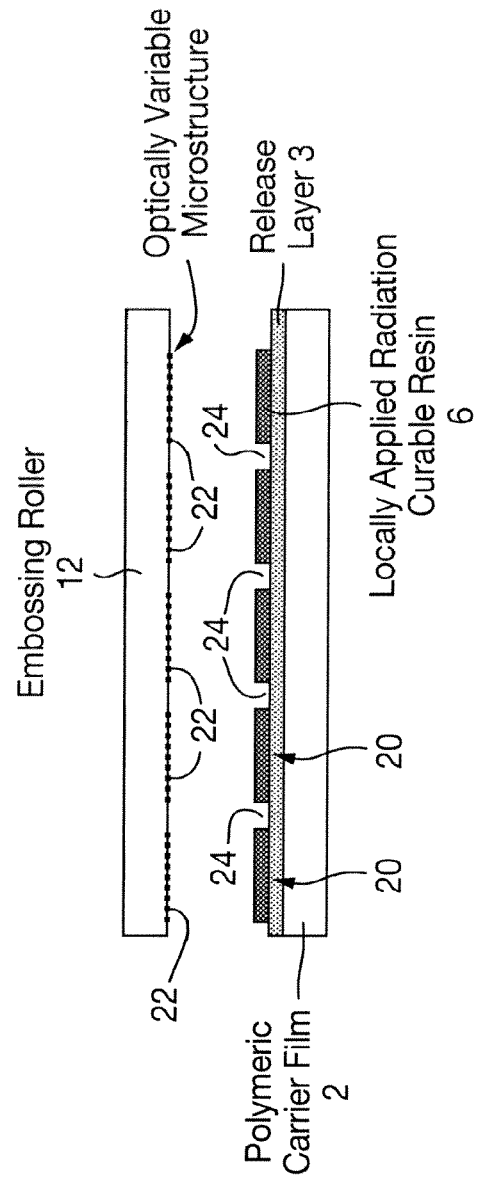

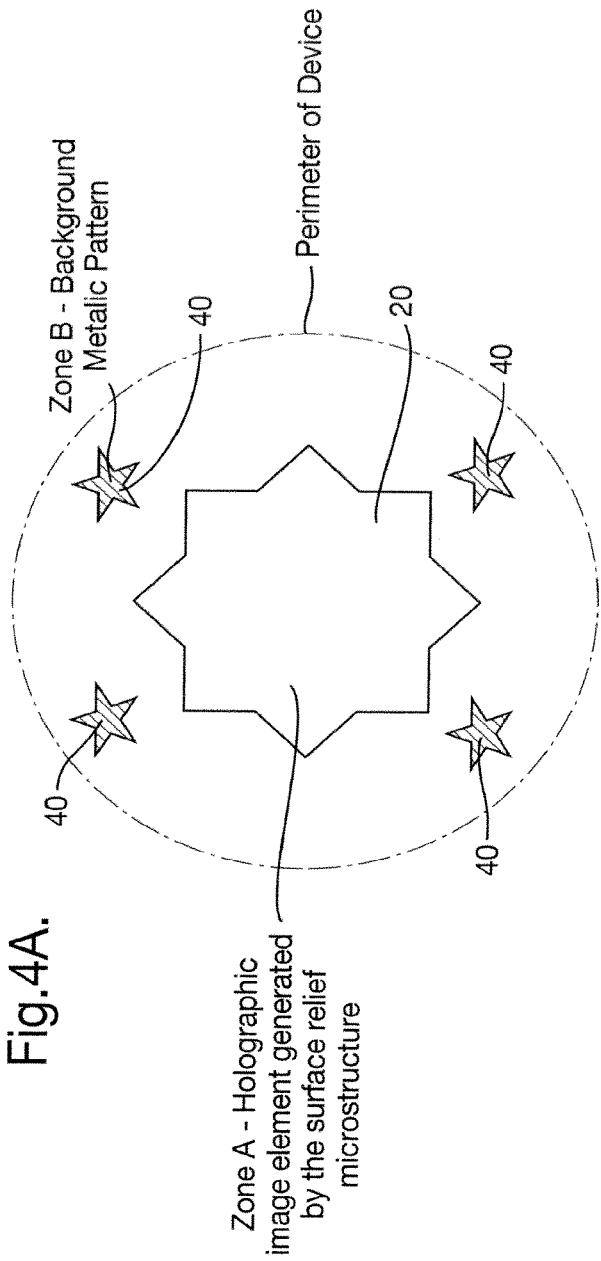
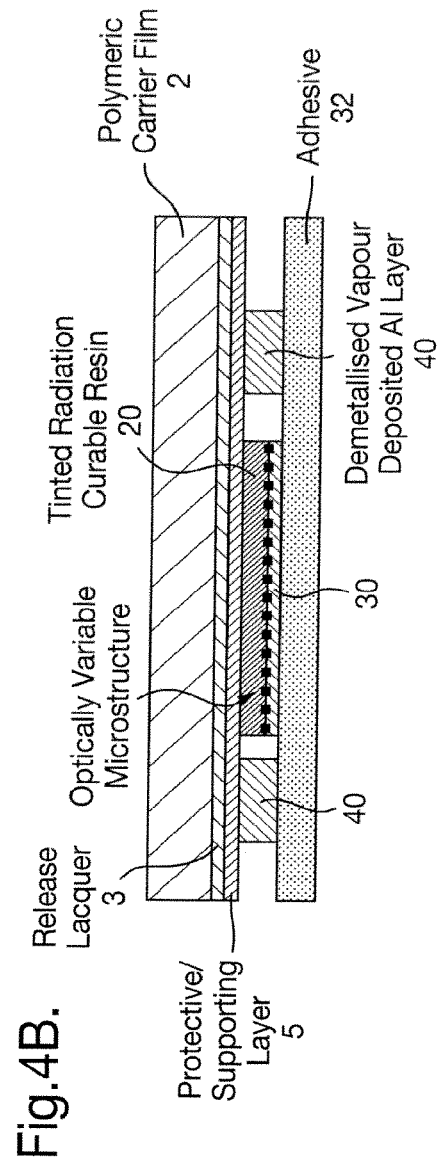
Fig.4A.
Fig.4B.

SECURITY DEVICE

This is a Division of application Ser. No. 13/580,995 filed Oct. 26, 2012, which in turn is a National Phase of International Patent Application No. PCT/GB2011/050362 filed Feb. 24, 2011, which claims priority to British Patent Application No. 1003136.7 filed Feb. 24, 2010. The disclosures of the prior applications are hereby incorporated by reference herein in their entireties.

The invention relates to a security device, in particular incorporating an optically variable effect generating structure, and a method for its manufacture.

Optically variable effect generating structures such as holograms and diffraction gratings have been used widely over the last few years to impart security to documents of value such as banknotes, credit cards and the like. Conventionally, the structure is provided on a transfer foil and is then hot stamped from the transfer foil onto the final substrate. An early example of this approach is described in U.S. Pat. No. 4,728,377.

There is a need to increase the security of such devices and one approach is described in EP-A-1294576. In this case, the hologram or diffraction grating is spatially modulated by two or more metals provided in intimate contact with the surface relief. This varies the intensity of the diffractive light in an unconventional and difficult to replicate manner. However, the use of two metals is difficult in practice and expensive and there is a need to provide a simpler approach. Furthermore vapour deposited metals provide a very limited choice of colours.

In accordance with the first aspect of the present invention, a security device comprises a transparent, coloured element in a first region of the device and in a surface of which a first optically variable effect generating relief structure is formed; and a reflection enhancing layer extending over the first optically variable effect generating relief microstructure and following the contour of the relief, the reflection enhancing layer also being provided in a second region of the device laterally offset from the first region.

A novel security device has been developed which provides an optically variable effect from a coloured element and makes use of the reflection enhancing layer used to enhance the optically variable effect by providing that reflection enhancing layer in the second region. In the second region, the reflection enhancing layer can simply be a plain layer which will present a distinctive, plain appearance to the observer or it could be formed with patterns defining symbols, characters and the like. In a particularly preferred embodiment, the second region includes a second, transparent coloured element having a colour different from the colour of the first transparent coloured element, a surface of the second transparent, coloured element being provided with a second optically variable effect generating relief microstructure, the reflection enhancing layer extending over the second optically variable effect generating relief microstructure and following the contour of the relief. This provides a multi-coloured device in which both colours are enhanced by the reflection enhancing layer.

The reflection enhancing layer can be a metal layer, which could be a pure metal or a metal containing layer, or a high refractive index layer such as ZnS or the like.

Where a metal or metallic layer is provided, this combines with at least the transparent, coloured element in the first region to present an unusual coloured, metallic effect to the viewer.

As mentioned above, the reflection enhancing layer follows the contour of the surface relief and typically, the reflection enhancing metallic layer will be in contact with the surface of the element in which the microstructure is formed. However, it could be spaced from that element by an intermediate transparent layer or the like, provided that intermediate layer was sufficiently thin so that the reflection enhancing layer again followed the surface relief contour.

Typically, the second region surrounds or fully encloses the first region although in some cases it could be laterally offset in just one dimension.

It is particularly convenient if one or more parts of the reflection enhancing layer are formed as one or more symbols, characters, alphanumeric figures or other graphical shapes. This enables a variety of characters to be provided in one or both regions and these can be related to the article on which the security device is provided.

The first and second regions could be spaced apart or abut one another. In the former case, where first and second elements are provided, different optically variable effect generating surface relief microstructures could be provided on each element while in the latter case typically the surfaces of the elements are formed of different parts of the same optically variable effect surface relief microstructure.

The device can be constructed in a variety of different ways, for example directly on an article to be protected but typically will be provided initially in the form of a transfer structure. In other embodiments, the security device can be used to form a stripe assembly.

In order to adhere the device to an article, the device preferably further comprises an adhesive layer, for example a photosensitive or heat sensitive adhesive layer, over the transparent substrate. Alternatively, adhesive could be provided on the article itself.

The or each optically variable effect generating surface relief microstructure can have any conventional form but typically comprises one or more of a hologram, diffraction grating, prismatic structure, and microlens array.

In accordance with a second aspect of the present invention, a method of manufacturing a security device comprises providing a curable material on a carrier to define a transparent, coloured element in a first region; forming a surface of the element with an optically variable effect surface relief microstructure; curing the material so that the microstructure is retained by the cured material; and providing a reflection enhancing layer extending over the first optically variable effect surface relief microstructure following the contour of the relief, the reflection enhancing layer also being provided in a second region laterally offset from the first region.

Techniques which can be used in this method include cast curing, hot embossing and in-situ polymerisation replication (ISPR). An example of this latter technique is UV casting.

U.S. Pat. No. 4,758,296 describes the production of a holographic foil, generated by UV casting, which can be transferred to a substrate as a patch using the hot stamping process. In order to facilitate the hot stamping process a UV curable polymer is selected which is brittle enabling it to fracture at the edges of the region contacted by the stamping die. This solution is not ideal for applications concerning flexible documents as the use of a brittle material will reduce the durability of the final device especially if, as is the case with a banknote, the document is repeatedly folded or crumpled during circulation. The use of a brittle material also becomes more problematic the thicker the device becomes, making the prior art solution even less suitable for the replication of the non-holographic micro-optical devices.

In a preferred embodiment, the method further comprises providing a second, transparent coloured element in the second region on the carrier, the second element having a colour different from the colour of the first transparent, coloured element, providing a surface of the second transparent, coloured element with a second optically variable effect generating relief microstructure, and wherein the reflection enhancing layer is provided over the second, transparent coloured element following the contour of the relief. Preferably, the two regions are spaced apart and formed with respective reflection enhancing layers. The advantage of this is that the cured material does not have to be fractured during the hot stamping process and thus can easily transfer onto an article during hot stamping or as a label. A similar approach is described in U.S. Pat. No. 6,302,989.

Preferably, the reflection enhancing layer also extends across areas between and/or laterally outside the cured elements.

The optically variable effect generating relief microstructures may be embossed into the cured or curable materials or provided in other known ways such as by cast curing.

Typically, the discrete regions of the curable materials are printed onto the carrier although other known forms of deposit could be used.

The reflection enhancing layer may be provided over both the elements and areas where there is no cured or curable material.

The reflection enhancing layer may be formed from a pure metal such as aluminium, copper or gold or alternatively may include one or more colourants.

The method may further comprise forming parts of the reflection enhancing layer as one or more symbols, characters, alphanumeric figures or other graphical shapes. In this case, the forming step may include selectively demetallising the metallic layer.

In order to fix the security device onto an article, it is necessary to provide an adhesive layer. Although this could be provided on the article and then the security device brought into contact with the adhesive, preferably the method further comprises providing an adhesive layer, for example a photosensitive or heat sensitive adhesive layer, over the cured, embossed material and after the IC) provision of a reflection enhancing layer if provided.

Examples to which security devices according to the invention can be applied include banknotes, cheques, passports, identity cards, certificates of authenticity, fiscal stamps and other documents for securing value or personal identity.

Some examples of security devices and methods of manufacture according to the invention will now be described and contrasted with a known example with reference to the accompanying drawings, in which:—

FIG. 2 illustrates a comparative example;

Figure 3A:
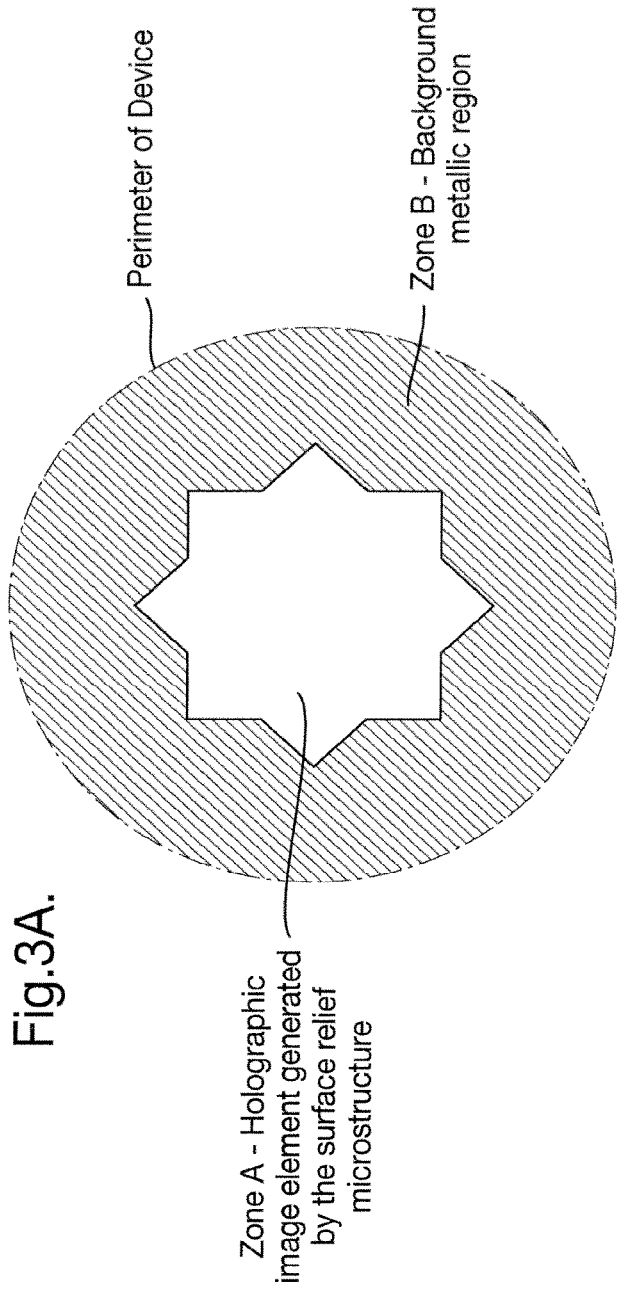
FIGS. 3A and 3B are a plan and cross-section respectively and not to scale of a security device made according to an example of the invention.
Figure 3B:
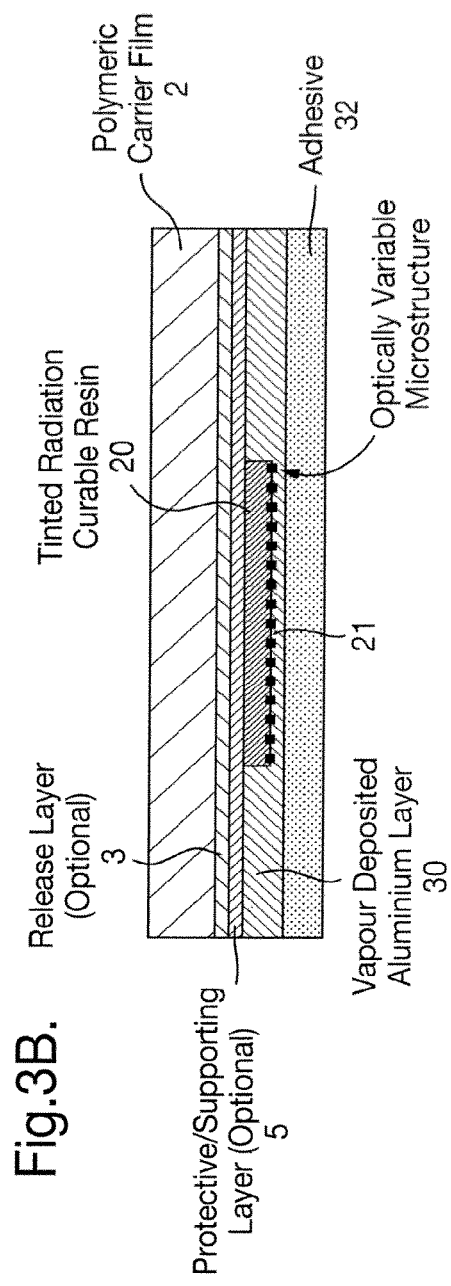

FIGS. 4A, 4B; 5A, 5B; 6A, 6B; and 7A and 7B are views similar to FIGS. 3A and 3B respectively but of further examples of security devices made according to different methods according to the invention.

Figure 1:
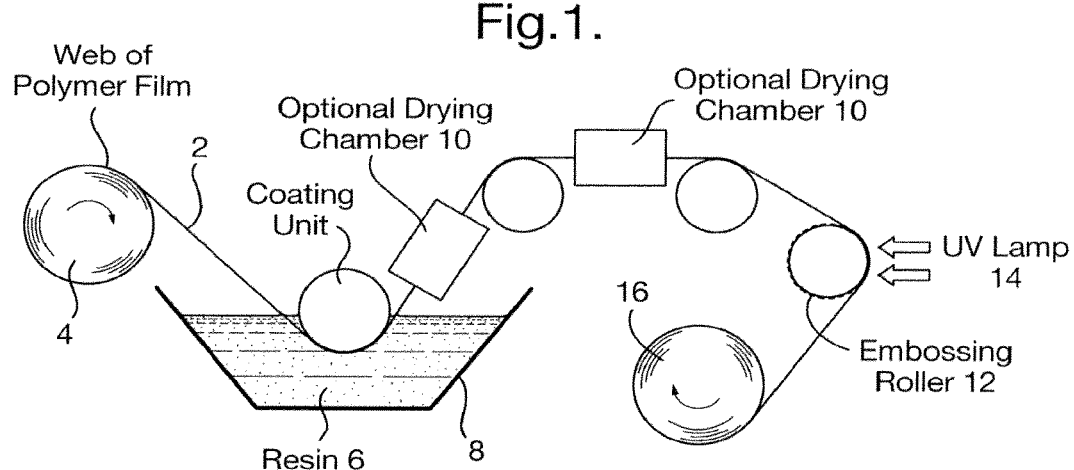
FIG. 1 is a schematic view of a known manufacturing apparatus.

FIG. 1 illustrates schematically a continuous in-situ polymerisation replication process as is currently known in the art.

A web 2 of polymer material such as polyethylene terephalate (PET) or biaxially oriented polypropylene (BOPP) is unwound from a reel 4 and coated with a UV curable resin 6 in a coating unit 8. An optional drying chamber 10 can be used to remove solvent from the resin. The resin 6 on the web 2 is then held in contact with an embossing roller 12 in order to replicate the optically variable microstructure, embossed into the roller, in the resin. The embossed resin 6 is then cured and hardened while in contact with the embossing roller 12 using appropriate radiation such as ultra violet light 14. The final web comprising the optically variable microstructure is then rewound onto a reel 16.

The resin 6 is typically applied to the substrate using one of precision bead coating, direct and indirect gravure coating, meyer bar coating or slot coating. The radiation curable material preferably comprises a resin which may typically be of two types:

a) Free radical cure resins which are unsaturated resins or monomers, prepolymers, oligomers etc. containing vinyl or acrylate unsaturation for example and which cross-link through use of a photo initiator activated by the radiation source employed e.g. UV.

b) Cationic cure resins in which ring opening (e.g. epoxy types) is effected using photo initiators or catalysts which generate ionic entities under the radiation source employed e.g. UV. The ring opening is followed by intermolecular cross-linking.

The radiation 14 used to effect curing will typically be UV radiation but could comprise electron beam, visible, or even infra-red or higher wavelength radiation, depending upon the material, its absorbance and the process used. The web 2 is preferably a polymeric film and will be substantially transparent so that the optically variable effect structure can be provided on a surface of the transparent resin 6 on the web which will not be externally exposed in use, while permitting the optically variable effect to be viewed through the substrate. Flexible polymeric films suitable for the invention include polyethylene teraphthalate (PET), polyethylene, polyamide, polycarbonate, poly(vinylchloride) (PVC), poly(vinylidenechloride) (PVdC), polymethylmethacrylate (PMMA), polyethylene naphthalate (PEN), and polypropylene.

The optically variable structure may comprise a hologram or diffraction grating or a non-holographic micro-optical structure. Prismatic structures are a preferred type of a micro-optical structure. Examples of prismatic structures suitable for the current invention include, but are not limited to, a series of parallel linear prisms with planar facets arranged to form a grooved surface, a ruled array of tetrahedra, an array of square pyramids, an array of corner-cube structures, and an array of hexagonal-faced corner-cubes. A second preferred type of micro-optical structure is one which functions as a microlens including those that refract light at a suitably curved surface of a homogenous material such as plano-convex lenslets, double convex lenslets, plano-concave lenslets, and double concave lenslets. Other suitable micro-optical structures include geometric shapes based on domes, hemispheres, hexagons, squares, cones, stepped structures, cubes, or combinations thereof.

In the new process, the known process has been modified to enable more complex, secure and aesthetically pleasing security devices comprising optically variable structures to be created.

In the new process (FIGS. 1A and 2), the radiation curable resin is applied, typically by printing at a printing unit 7 in place of the coating unit 8 only partially onto a release layer 3 on the flexible polymeric substrate web 2 and typically in register with the optically variable microstructures 22 on the embossing roller 12. At least one coloured radiation curable resin is used each in register with one or more optically variable microstructure. Suitable printing methods include direct and indirect gravure printing, flexographic printing, lithographic printing and screen printing.

Figure 1A:
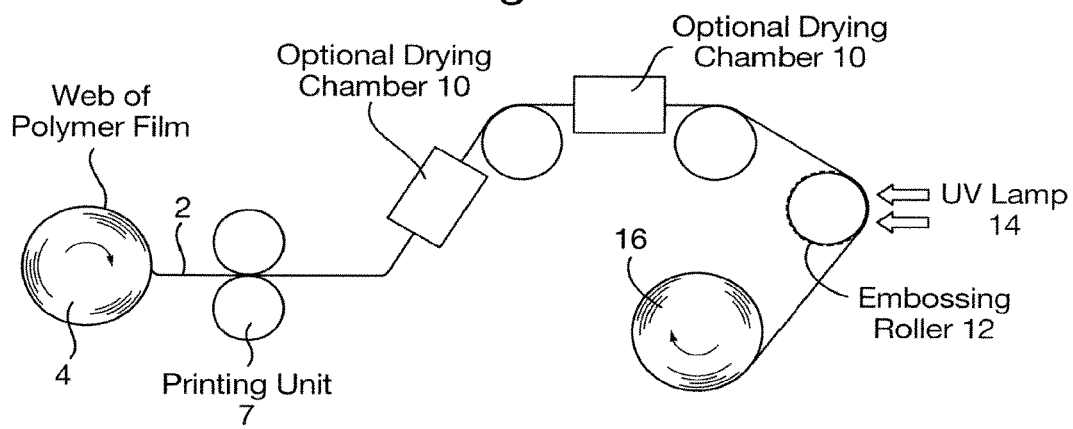
FIG. 1A is a view similar to FIG. 1 but of apparatus for use in a method according to the invention.

Thus, in FIGS. 1A and 2 the coating unit 8 in FIG. 1 is modified such that it is capable of applying, typically printing, the radiation curable resin in localised regions or patches 20. This has the benefit that the resin 6 only needs to be applied in the regions 20 on the web 2 that will ultimately form the security device. The locally applied regions 20 of the radiation curable resin 6 are preferably in register with the optically variable microstructures 22 on the embossing roller 12 as shown schematically in FIG. 2 where the regions of resin 20 are aligned with respective regions of microstructures 22 on the embossing roller 12. The result of this is a series of patches or discrete devices across the polymeric carrier web 2 which exhibit the desired optically variable effect.

The patches or discrete devices 20 after curing can then be easily transferred to a secure document such as a banknote using a conventional hot stamping transfer process because the stamping tool does not need to cut through the inherently strong radiation cured resin and instead just needs to penetrate the release layer on the polymeric carrier substrate. Spaces 24 between the devices 20 define the boundaries of the devices.

If the optically variable effect is a holographic generating structure, and by this we mean structures that generate graphical images by the mechanism of diffraction of light, then a reflection enhancing layer is usually provided on the optically variable microstructure. The holographic generating structures include those formed by the following non-exhaustive list of techniques optical interferometry dot-matrix interferometry, lithographic interferometry or e-beam lithography. The reflection enhancing layer can be a vacuum deposited metallic layer, a printed metallic layer or a substantially transparent high refractive index layer. If a vapour deposited metallic layer is used this may be selectively demetallised by etching or the like to enable underlying information to be visible when the device is secured to an article or document.

The secure nature of the security device generated in FIG. 2 is increased by the use of coloured radiation curable resins. The resin 6 can be tinted by using dyes or pigments. The resin will still need to be substantially transparent for the final diffractive element to replay and therefore dyes are the preferred tinting method rather than pigments. This enables the creation of coloured holographic or diffractive security devices. Previously different background colour variations have been achieved by using different coloured reflection enhancing layers for example replacing vapour deposited aluminium with vapour deposited gold or copper but in this case the choice of colours available are limited by the relatively small number of metals suitable for cost effective vapour deposition.

FIG. 3 shows a first embodiment of a security device according to the invention in cross-section (3B) and plan-view (3A) where the radiation curable resin has been tinted to create a device with a dual coloured background. In this example, a radiation curable resin patch or element 20 which has been tinted green using either a dye or pigment is coated or printed onto the polymeric carrier web 2. If required an optional release layer 3 is used directly on the surface of the polymeric carrier substrate and a further protective/supporting layer 5 may be provided on the release layer 3. The protective layer 5 is preferably a conventional thermal/chemical cross linked layer of the type normally employed as scuff coats within conventional hot stamped foils. Such layers unlike the UV cured layer are easier to break during hot stamping process. In this example, the radiation curable resin is applied in a discrete area 20 which is registered to a holographic optically variable microstructure on the embossing roller (not shown). This is then embossed or cast into the resin element 20 as shown at 21. FIG. 3 illustrates exact registration between the holographic optically variable microstructure 21 and the radiation curable resin element 20 but in practice the holographic variable microstructure may be slightly inset to allow for production tolerances. The radiation curable resin does not necessarily need to follow the same outline as the holographic optically variable microstructure with the main requirement being that the optically variable microstructure is registered such that it is surrounded by the radiation curable resin. A reflection enhancing layer 30 is then applied as a continuous layer over the security device, in this case a vapour deposited aluminium layer is used. Although not shown in the drawings, this metal layer follows the contour of the surface relief microstructure. (The same is true for all other embodiments). Preferably the reflection enhancing layer is a pure metal such as AL, Cu or Au but this is not essential. Alternatively the reflection enhancing layer could be a substantially transparent high refractive index (hri) layer. Such materials, typically inorganic, are well known in the art and described in U.S. Pat. No. 4,856,857. Typical examples of materials suitable for the high refractve index layer include zinc sulphide, titanium dioxide and zirconium dioxide. Replacing the vapour deposited metal reflection enhancing layer with a transparent hri layer is particularly beneficial when the security device of the current invention is applied over transparent regions (typically known as apertures or windows) of secure documents. For example if the reflection enhancing layer for the security device illustrated in FIGS. 3A and 3B was replaced with a transparent hri layer than when viewed in reflection the holographic image in zone A will be viewed against a reflective green background and zone B will appear colourless. When viewed in transmission zone A will appear green against a transparent background. The holographic image will not be readily apparent when viewed in transmission and therefore the contrast between the reflection and transmission viewing conditions can be used as a method of authentication.

Finally an adhesive layer 32 is applied to the reflection enhancing layer 30 to enable the device to be applied to a document of value. The security device is then transferred to a secure document by hot stamping. After transfer the carrier web 1 may be removed, leaving the security device as the exposed layer.

On viewing the security device in FIG. 3A, once applied to the secure document, a holographic image defined by the optically variable microstructure 21 is observed in zone A viewed against a green metallic background as a result of the combination of the metallic reflection enhancing layer 30 and the tinted radiation curable resin 20. The rest of the device (Zone B) appears metallic silver due to the vapour deposited aluminium layer 30 and therefore a dual-coloured holographic optically variable device is created.

FIGS. 4A and 4B show a further modification of the security device in FIGS. 3A and 3B where the vapour deposited aluminium layer 30 has been demetallised to create discrete star-shaped metallic images 40. Although not illustrated the aluminium layer in contact with the holographic optically variable microstructure could also be demetallised to create sub-regions within the holographic image.

Figure 5A:
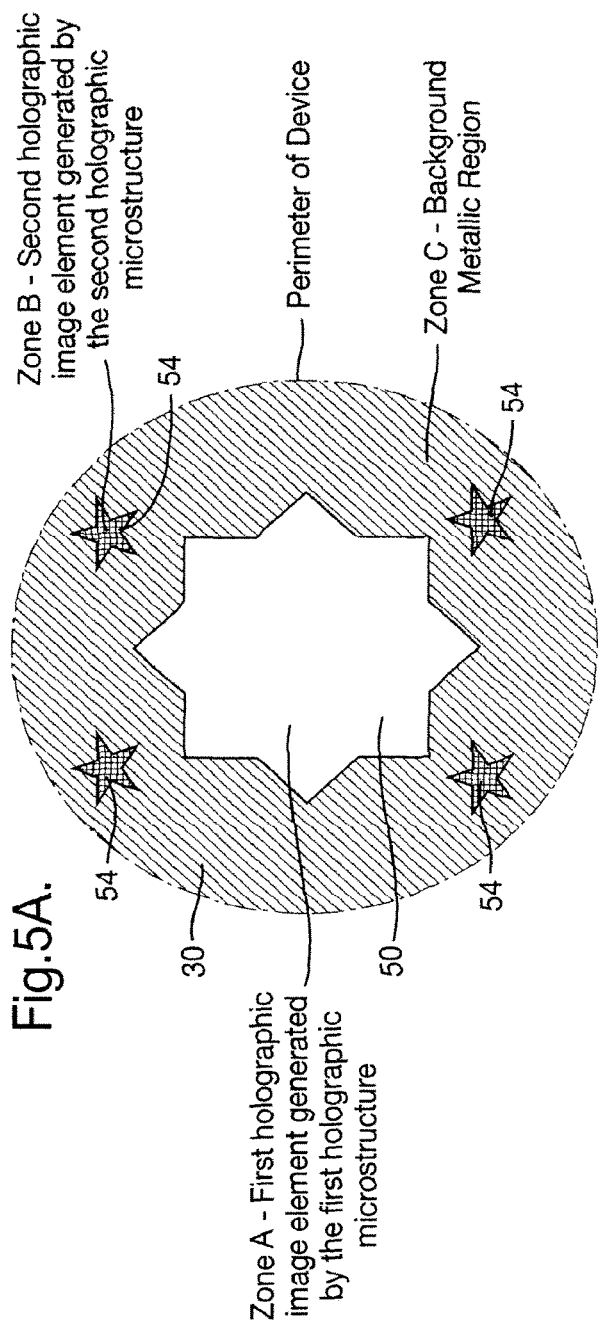
Figure 5B:
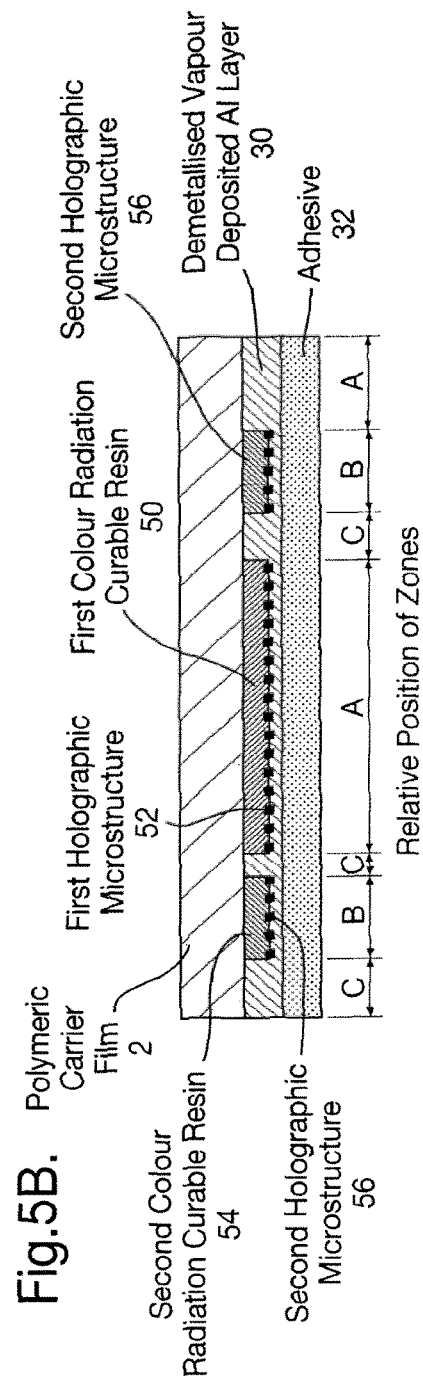

A preferred embodiment of the current invention is a security device comprising an optically variable microstructure in the form of one or more holographic generating microstructures where the one or more holographic generating microstructures are formed in at least one region of a layer of a radiation curable resin where the layer is provided by registered printing of at least two differently coloured resins. Preferably the differently coloured resins are registered to one or more of the holographic generating microstructures. FIGS. 5A and 5B show an example of such a device in plan-view and cross-section respectively. As can be seen from FIG. 5, a first radiation curable resin element 50 tinted green is in register with the first holographic microstructure 52 to define a first holographic image in zone A. Second radiation curable resin elements 54 tinted blue and laterally offset from the element 52 are in register with a second holographic microstructure 56 to define second holographic images in zone B. A reflection enhancing layer 30 is then applied as a continuous layer over the security device, in this case a vapour deposited aluminium layer is used. Finally, an adhesive layer 32 is applied to the reflection enhancing layer to enable the device to be applied to a document of value. On viewing the secure device the holographic image in zone A is viewed against a metallic green background, and the holographic images in zone B are viewed against a metallic blue background whereas the rest of the device (Zone C) appears metallic silver due to the vapour deposited aluminium layer 30. An optically variable security device is created which appears to have three different reflection enhancing layers but has been produced by the registered printing of two different coloured radiation curable resins as a first stage in an ISPR process.

Figure 6A:
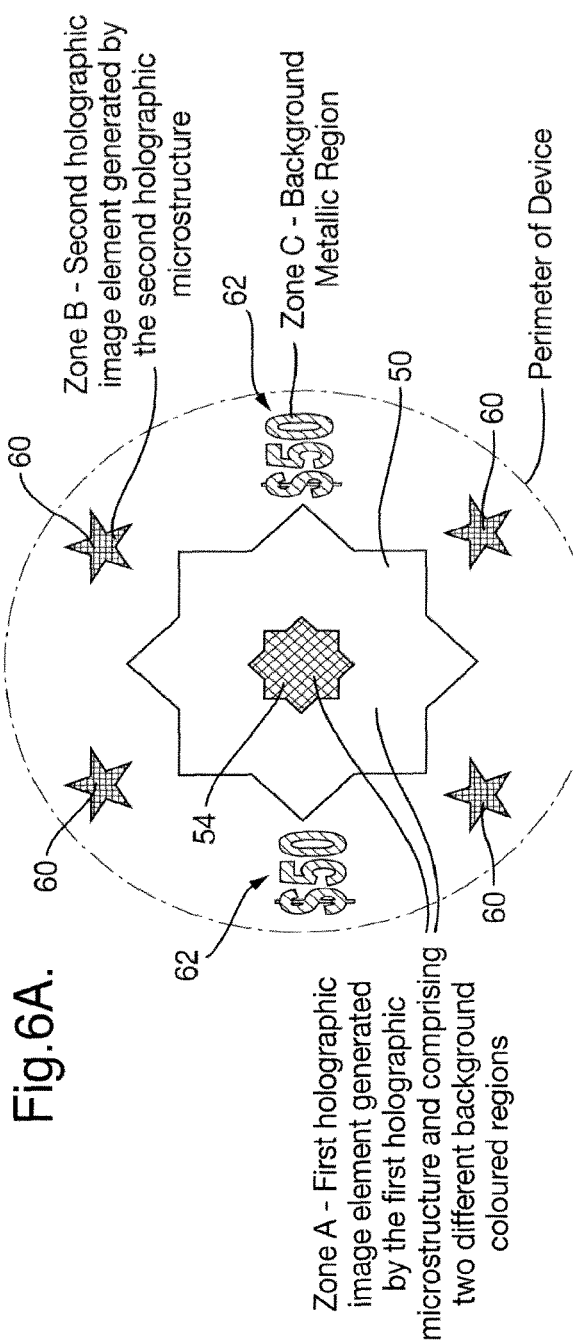
Figure 6B:
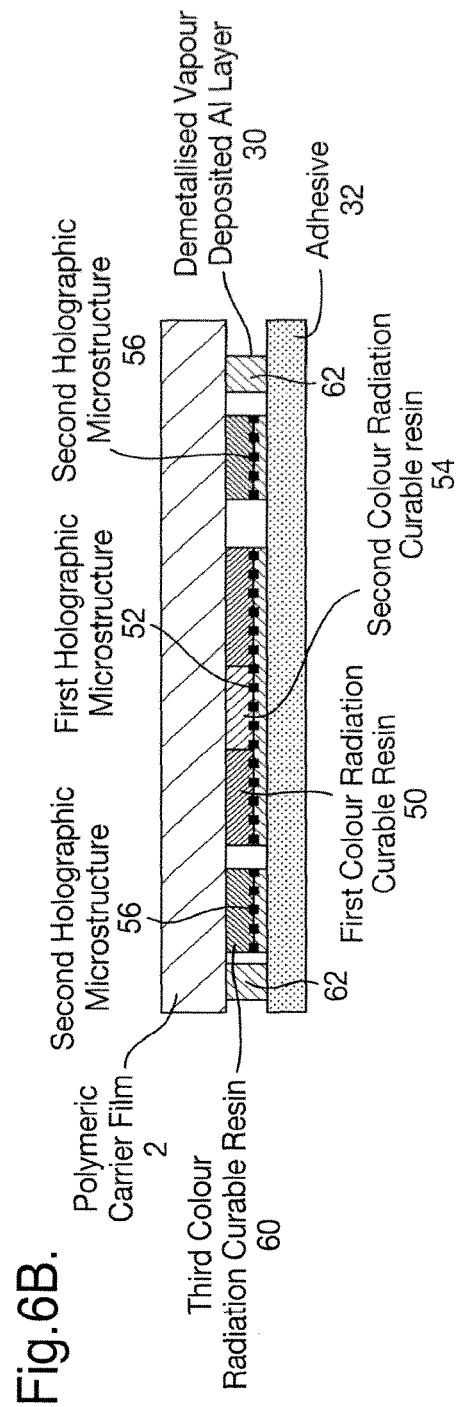

The secure nature of the security device in FIGS. 5A and 5B can be enhanced further by increasing the number of differently coloured radiation curable resin elements and preferably these are printed in register with further holographic generating microstructures. FIGS. 6A and 6B shows an example of such a structure. A first radiation curable resin element tinted green 50 and a second radiation curable resin element tinted yellow 54 are printed in register with the first holographic microstructure 52 to define a first holographic image with a multicoloured background in zone A. A third radiation curable resin element tinted blue 60 is printed in register with a second holographic microstructure 56 to define a second holographic image in zone B. Finally the vapour deposited aluminium layer 30 is then demetallised to remove the metal in the non holographic image areas 40 except in zone C where the plain metallic regions forms an identifying symbol 62 which in this case is the denomination of the secure document being protected. This example illustrates that differently coloured radiation curable resin elements can be registered to a single holographic microstructure such that different regions of the resultant holographic image have different background colours. In a modification (not shown), the plain metallic regions 62 could be omitted.

Figure 7A:
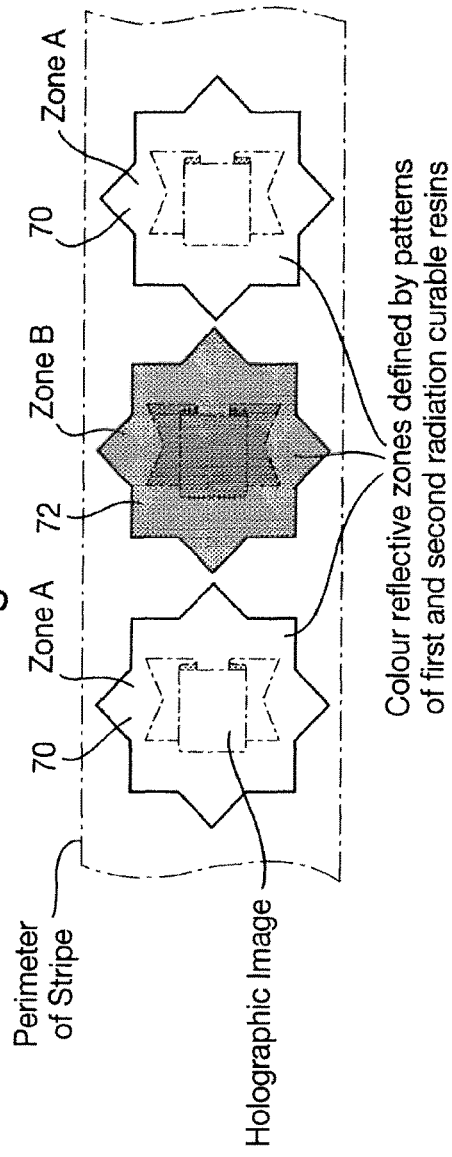
Figure 7B:
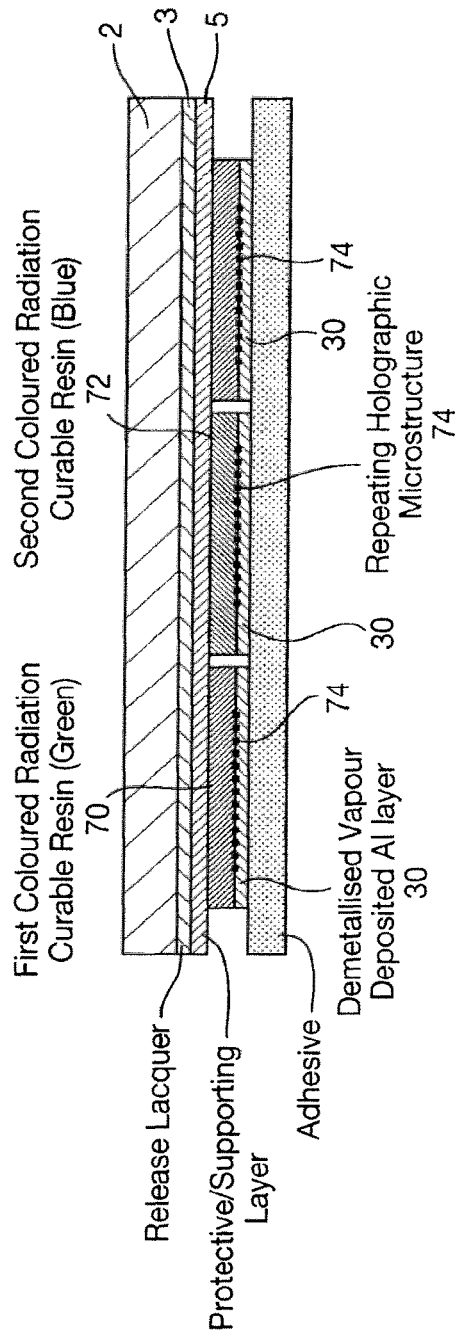

FIGS. 7A and 7B illustrate a plan and cross-sectional view of a coloured holographic stripe with two differently coloured radiation curable resin elements, for example one 70 tinted green and one 72 tinted blue, registered to a repeating holographic microstructure 74. The structure is supported on carrier webs by release and protective layers 3,5. A vapour deposited aluminium layer 30 is applied over the device and then demetallised in register with the differently coloured radiation curable resins 70,72. The final stripe has a repeating design of a holographic image which can be seen on an alternating green and blue metallic backgrounds (Zone A and B respectively). One advantage of this technique is that it can be used to provide the illusion of a series of differently coloured discrete holographic patches along a continuous stripe.

In all the previous examples the reflection enhancing layer has been a vapour deposited aluminium layer 30. It is of course also possible to use different vapour deposited metals for example copper and gold and of course more than one metal can be used on a single device to generate even more secure devices.

In a further embodiment the vapour deposited metal layer can be replaced by a printed metallic layer. One of the advantages of using a metallic ink compared to a vapour deposited metallic layer is the ability to add colourants to the metallic ink, for example by using pigments or dyestuffs. This enables the creation of multicoloured holograms because the reflective layer can be formed by the registered printing of multicoloured metallic inks. Furthermore, the metallic flakes in the ink can be varied typically from aluminium (silver effect), bronze (gold effect), iron or zinc to give different coloured effects.

The brightness of the printed metallic ink layer can be enhanced by incorporating an additional visually transparent, high refractive index layer into the structure, as described in PCT/GB2008/003634. By high refractive index, we mean an index of refraction which exceeds that of the embossed base layer by a numerical value of 0.5 or more. Since the refractive index of the embossed base layer will typically fall in the range of 1.45-1.55 then a high refractive index material will be one with an index of 2.0 or more. In practice high refractive index materials with good visual transparency transparent will have an index in the range 2.0-2.5.

An optimum brightness can be achieved by carefully determining the thickness of the high refractive index layer needed to ensure constructive interference between the two partial amplitudes diffracted off the first and second surfaces of the high refractive index layer. The first surface being that which forms the interface with surface relief of the embossed base layer, whilst the second surface being that which forms the interface with the metallic ink. The thickness of the high refractive layer required to ensure constructive interference between the partial diffracted amplitudes differs from that needed to ensure constructive interference between partial amplitudes reflected off two strictly planar interfaces and is best determined empirically by practical methods as its precise value depends on the periodicities and amplitudes present in the optically variable microstructure.

A modified version (FIG. 1A) of the ISPR method illustrated in FIG. 1 can be used to form the security device using the new method.

The first step is to print one or more radiation curable resin elements on a polymeric carrier film where each resin element has been preferably tinted by dyes or pigments such that they provide the final device with more than one base colour. The resin will still need to be substantially transparent for the final diffractive/holographic element to replay and therefore dyes are the preferred tinting method rather than pigments. An optically variable microstructure is then cast, for example by using an embossing roller as illustrated in FIG. 1, into the one or more resin elements to generate a design which is preferably in register to the coloured pattern of the base layer.

A reflection enhancing layer is then applied over the radiation curable resin elements either as continuous layer or as partial layer preferably in register with either one or more of the radiation curable resins or the optically variable microstructure. The reflection enhancing layer can be applied by vapour deposition or printing and more than one reflection enhancing layer can be applied to create further coloured effects.

The finished device can be applied to an article or document in a variety of different ways, some of which are set out below. The security device could be arranged either wholly on the surface of the document, as in the case of a stripe or patch, or may be visible only partly on the surface of the document in the form of a windowed security thread.

Security threads are now present in many of the world's currencies as well as vouchers, passports, travellers' cheques and other documents. In many IC) cases the thread is provided in a partially embedded or windowed fashion where the thread appears to weave in and out of the paper. One method for producing paper with so-called windowed threads can be found in EP0059056. EP0860298 and WO03095188 describe different approaches for the embedding of wider partially exposed threads into a paper substrate. Wide threads, typically with a width of 2-6 mm, are particularly useful as the additional exposed area allows for better use of optically variable devices such as the current invention.

The device could be incorporated into the document such that regions of the device are viewable from both sides of the document. Techniques are known in the art for forming transparent regions in both paper and polymer substrates. For example, WO8300659 describes a polymer banknote formed from a transparent substrate comprising an opacifying coating on both sides of the substrate. The opacifying coating is omitted in localised regions on both sides of the substrate to form a transparent region. In one embodiment the transparent substrate of the polymer banknote also forms the carrier substrate of the security device.

Alternatively the security device of the current invention could be incorporated in a polymer banknote such that it is only visible from one side of the substrate. In this case, the security device is applied to the transparent polymeric substrate and on one side of the substrate the opacifying coating is omitted to enable the security device to be viewed while on the other side of the substrate the opacifying coating is applied over the security device such that it conceals the security device.

Methods for incorporating a security device such that it is viewable from both sides of a paper document are described in EP1141480 and WO03054297. In the method described in EP1141480, one side of the device is wholly exposed at one surface of the document in which it is partially embedded, and partially exposed in windows at the other surface of the substrate.

In the case of a stripe or patch the security device is formed on a carrier substrate and transferred to the security substrate in a subsequent working step. The device can be applied to the security substrate using an adhesive layer. The adhesive layer is applied either to the device, or the surface of the security substrate to which the device is to be applied. After transfer, the carrier substrate may be removed, leaving the security device as the exposed layer.

Following the application of the security device, the security substrate undergoes further standard security printing processes to create a secure document, including one or all of the following; wet or dry lithographic printing, intaglio printing, letterpress printing, flexographic printing, screen printing, and/or gravure printing.

The invention claimed is:

1. A security device comprising:
    a first transparent coloured element disposed in a first region of the device, the first transparent coloured element defining a first surface;
    a second transparent colored element disposed in the first region of the device and being adjacent to the first transparent coloured element, the second transparent coloured element defining a second surface;
    a first optically variable effect generating relief microstructure extending across the first surface of the first transparent coloured element and the second surface of the second transparent coloured element;
    a third transparent coloured element disposed in a second region of the device, the second region being laterally offset and spaced apart from the first region, the third transparent coloured element defining a third surface;
    a second optically variable effect generating relief microstructure extending across the third surface of the third transparent coloured element; and
    a reflection enhancing layer extending: (i) across the first optically variable effect generating relief microstructure and following a first contour of the first optically variable effect generating relief microstructure, and (ii) across the second optically variable effect generating relief microstructure and following a second contour of the second optically variable effect generating relief microstructure, wherein
    the reflection enhancing layer extending across the first and second optically variable effect generating relief structures are formed of an identical material, and
    the reflection enhancing layer is provided in discrete portions in the first region and second region respectively.

2. The device according to claim 1, wherein the reflection enhancing layer extends continuously from the first region to the second region.

3. The device according to claim 1, wherein the second region surrounds the first region.

4. The device according to claim 1, wherein the first and third optically variable effect generating relief microstructures are different.

5. The device according to claim 1, wherein the reflection enhancing layer is one of a metal layer or high refractive index layer.

6. The device according to claim 1, wherein one or more parts of the reflection enhancing layer are formed as one or more symbols, characters, alphanumeric figures or other graphical shapes.

7. The device according to claim 1, wherein the first and third elements have different shapes.

8. The device according to claim 1, further comprising
    an adhesive layer disposed over the transparent, coloured element, wherein
    the adhesive layer is photosensitive or heat sensitive.

9. The device according to claim 1, wherein the or each optically variable effect generating surface relief microstructure comprises one or more of a hologram, diffraction grating, prismatic structure, and microlens array.

10. The stripe assembly having a sequence of security devices according to claim 1 spaced along a support, with the colours of successive transparent coloured elements in the first regions being different.

11. The transfer structure comprising a security device according to claim 1, supported on a carrier via a release layer and having an adhesive on its surface furthest from the carrier.

12. The security device according to claim 1, wherein the metallic layer is a metal.

13. A method of manufacturing a security device, the method comprising:
providing a curable material on a carrier to define a first transparent coloured element disposed in a first region of the device, the first transparent coloured element defining a first surface;
providing a second transparent colored element disposed in the first region of the device and being adjacent to the first transparent coloured element, the second transparent coloured element defining a second surface;
forming a first optically variable effect generating relief microstructure extending across the first surface of the first transparent coloured element and the second surface of the second transparent coloured element;
providing a third transparent coloured element disposed in a second region of the device, the second region being laterally offset and spaced apart from the first region, the third transparent coloured element defining a third surface;
forming a second optically variable effect generating relief microstructure extending across the third surface of the third transparent coloured element; and
curing the first, second and third first transparent coloured elements on the carrier so that the first and second optically variable effect generating relief microstructures are retained by the cured first, second and third first transparent coloured elements; and
providing a reflection enhancing layer extending: (i) across the first optically variable effect generating relief microstructure following a first contour of the first optically variable effect generating relief microstructure, and (ii) across the second optically variable effect generating relief microstructure and following a second contour of the second optically variable effect generating relief microstructure, wherein
the reflection enhancing layer extending across the first and second optically variable effect generating relief structures are formed of an identical material, and
the reflection enhancing layer is provided in discrete portions in the first region and second region respectively.

14. The method according to claim 13, wherein the reflection enhancing layer extends continuously from the first region to the second region.

15. The method according to claim 13, wherein the second region surrounds the first region.

16. The method according to claim 13, wherein the first and third optically variable effect generating relief structures are different.

17. The method according to claim 13, wherein the reflection enhancing layer comprises a metal or high refractive index layer.

18. The method according to claim 13, wherein the optically variable effect generating relief microstructures are cast or embossed into the curable materials.

19. The method according to claim 13, wherein the curable material is printed onto the carrier.

20. The method according to claim 13, wherein the reflection enhancing layer is provided over both the cured regions and areas where there is no cured or curable material.

21. The method according to claim 13, wherein the reflection enhancing layer is vacuum deposited or printed.

22. The method according to claim 13, wherein the reflection enhancing layer is printed using a metallic ink including one or more colourants.

23. The method according to claim 13, further comprising
forming parts of the reflection enhancing layer as one or more symbols, characters, alphanumeric figures or other graphical shapes.

24. The method according to claim 23, wherein the forming step comprises selectively demetallising a metallic layer.

25. The method according to claim 13, further comprising
providing an adhesive layer over the cured material and after the provision of the reflection enhancing layer, wherein
the adhesive layer is photosensitive or heat sensitive.

26. The method according to claim 13, wherein the or each optically variable effect generating relief microstructure comprises one or more of a hologram, diffraction grating, prismatic structure, and microlens array.

27. A security device manufactured according to claim 13.

28. The security device according to claim 27, the device comprising a label or stripe.

29. A method of transferring a security device on a carrier web manufactured according to claim 13 onto an article to which it is secured by adhesive, the method comprising hot stamping the security device onto the article with a heat sensitive adhesive between the security device and the article.

30. An article provided with a security device according to claim 1.

31. The article according to claim 30, wherein the article is at least one of a security article, a security document, banknotes, checks, passports, identity cards, certificates of authenticity, fiscal stamps or other types of documents for securing value or personal identity.

* * * * *